United States Patent Office 2,907,737
Patented Oct. 6, 1959

2,907,737
RESIN ACID ESTERS OF POLYHYDRIC PHENOLS

Sylvan O. Greenlee, Racine, Wis., assignor to S. C. Johnson & Son, Inc., Racine, Wis.

No Drawing. Application June 30, 1955
Serial No. 519,278

16 Claims. (Cl. 260—22)

This invention relates to a new class of synthetic esters prepared from a resin acid and a polyhydric phenol. More particularly, this invention embraces a novel synthetic polyester prepared by esterifying with a resin acid the phenolic hydroxyl groups of a polyhydric phenol which is the mixed ester of a polyhydric alcohol, a dicarboxylic acid, and an hydroxyaryl-substituted acid.

An object of this invention is the production of new compositions of matter from naturally-occurring resin acids and a polyhydric phenol, for use in the preparation of coating, molding, and adhesive compositions.

Another object of this invention is the production of new high melting compositions of matter which, when used in a coating, are characterized by unusual chemical resistance, hardness, and gloss.

These and other objects and further advantages are attained by the present invention, various novel features of which will become more fully apparent from the following description, with particular reference to the illustrative specific examples.

The present compositions provide a chemical union in each molecule of the residues of one or more resin acids together with a polyhydric phenol which has been tailored to suit a particular need. The polyhydric phenol herein contemplated may be compounds such as those disclosed in the copending Greenlee application of even date, Serial No. 519,276, entitled "Polyhydric Phenols From Mixed Esters." These materials, having controlled molecular weights, hydroxyl content, softening points and solubility characteristics, are the mixed esters derived from a polyhydric alcohol, one or more dicarboxylic acids and a bis(hydroxyaryl)-substituted aliphatic acid. Such compositions may be prepared, for example by reacting 4 mols of 4,4-bis (hydroxyphenyl)-pentanoic acid with 2 mols of glycerol and 1 mol of succinic anhydride.

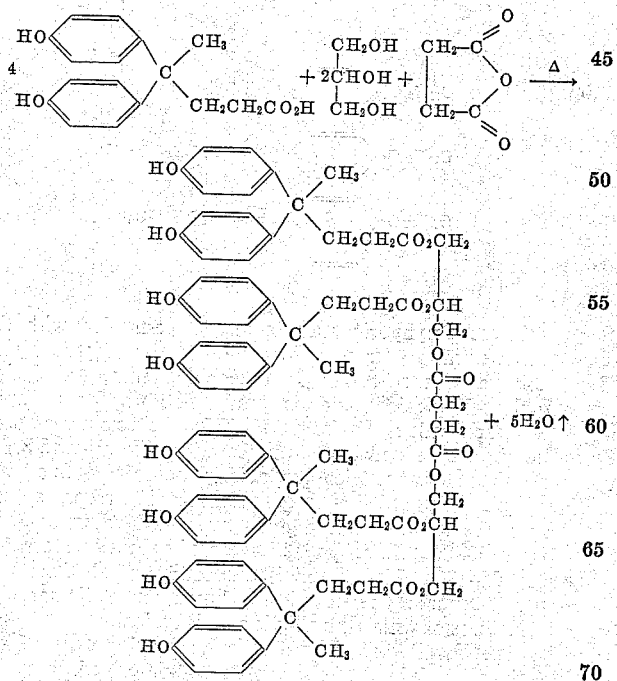

The aryloxy-substituted acid contemplated for use herein should have two hydroxyphenyl groups attached to a single carbon atom. The preparation of such an aryloxy acid is most conveniently carried out by condensing a keto-acid with the desired phenol. Experience in the preparation of bis-phenol and related compounds indicated that the carbonyl group of the keto-acid must be located next to a terminal carbon atom in order to obtain satisfactory yields. Prior applications, Serial Nos. 464,-607, and 489,300, filed October 25, 1954, and February 18, 1955, respectively, disclose a number of illustrative compounds suitable for use as the aryloxy-substituted acid and methods of preparing the same. These materials, which are referred to for convenience as Diphenolic Acid or DPA, consist of the condensation products of levulinic acid and phenol, substituted phenols, or mixtures thereof. It is to be understood that the phenolic nuclei of the Diphenolic Acid may be substituted with any group which will not interfere with the esterification reactions. For example, the nuclei may be alkylated with alkyl groups having up to 5 carbon atoms as disclosed in Serial No. 489,300 or they may be halogenated.

The polybasic acids suitable for use in preparing the desired mixed esters are exemplified by phthalic anhydride, maleic anhydride, succinic anhydride and the corresponding acids, aconitic acid, azelaic acid, sebacic acid, and the dimerized vegetable oil acids which are essentially 36-carbon aliphatic dibasic acids produced by the combination of two unsaturated 18-carbon vegetable oil acids through their olefin groups. Typical and illustrative of the dimerized vegetable oil acids is one marketed by Emery Industries, Inc. as their "Emery 955 Dimer Acid." Specifications given by the manufacturer on this dimer acid are: iodine value (modified Wijs method) 80–95, acid value 180–192, saponification value 185–195, and neutralization equivalent 290–310. A typical formula representing the dimerization of linoleic acid including a proposed structure of the dimeric acid is given as follows:

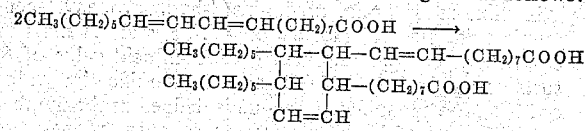

Further discussion on the preparation and structure of these dimeric acids is to be found in the following references: Bradley, T. F., et al., Ind. Eng. Chem. 32, 694, 802 and 963 (1940); and 33, 96 (1941).

The polyhydric alcohols used in the preparation of the subject mixed esters are illustrated by glycerol, the glycols such as ethylene glycol, polyethylene glycols, propylene glycol, polypropylene glycols, 1,4-butane-diol, 2,5-pentane-diol, 1,6-hexane-diol, neopentyl glycol; the higher polyols, such as erythritol, pentaerythritol, polypentaerythritols, sorbitol, mannitol; the unsaturated or substituted materials such as alpha-methyl glucoside, polyallyl alcohols, diethanolamine, triethanolamine, and tetramethylol cyclohexanol.

Esterification of the polyhydric alcohols with mixtures of Diphenolic Acid and polybasic acids is conveniently carried out by direct heating at temperatures of from 190–275° C. under conditions such that the water produced during the condensation is continuously removed as it is formed. Since the Diphenolic Acid, the polybasic acids, and the polyhydric alcohols having boiling points which are in all cases above 190° C., the water may be removed by permitting it to volatilize during esterification. Removal of the water may also be facilitated by continuously bubbling through the reaction mixture a stream of inert gas, such as carbon dioxide or nitrogen. It is also sometimes convenient to facilitate the water removal by carrying out the reaction in a vessel provided with condenser attached thereto through a water trap, adding a sufficient amount of a volatile, water-insoluble solvent to cause refluxing at the esterification temperature, continually removing the water by azeotropic distillation and permitting the solvent to return to the reaction mixture after having dropped the water in the water trap.

The order of addition of the various ingredients, polybasic acids, Diphenolic Acid, and polyhydric alcohols, to each other may be varied. It is sometimes advantageous to vary this order of addition to obtain optimum results with the particular combination of ingredients used. In the art of high temperature esterification, it is sometimes advantageous to use certain esterification catalysts which are also suitable for use in the preparation of the subject coating compositions. Other methods of esterification, such as esterification of polyhydric alcohols with the acid chlorides or acid interchange of the high molecular weight acids with the acetates of the polyhydric alcohols, may be used.

A brief study of the prior art will show the present polyhydric phenols to be unique. Heretofore, very few polyhydric phenols have been available wherein each hydroxyl group is attached to a different nucleus. Examples of such materials are bisphenol [bis(4-hydroxyphenyl)-isopropylidene] and the phenol-aldehyde condensation products. According to the teachings of the above-mentioned patent application of even date, the preparation of a great variety of polyhydric phenols is possible, depending on the choice of polyhydric alcohol or polybasic acid for the reaction.

Examples I to VIII illustrate the preparation and the properties of resinous polyhydric phenols suitable for use herein. The procedure used in preparing these resinous polyhydric phenols consists in all cases of heating the reaction mixtures with continuous agitation at temperatures of from 190–250° C. until the acid values indicated satisfactory esterification. In all cases an inert gas was bubbled through the reaction mixture during esterification, and the water was removed by distillation as formed.

Example I

A mixture of 1 mol of 4,4-bis(4-hydroxyphenyl)-pentanoic acid, 0.5 mol succinic anhydride, and 1.1 mols of ethylene glycol was esterified to give an acid value of 8, softening point of 112° C., and a saponification value of 317. The saponification value is defined as the number of milligrams of KOH required to saponify a one-gram sample. The softening points were measured by Durrans' Mercury Method (Journal of Oil and Colour Chemists Assoc. 12 173–175 (1929).

Example II

A mixture of 2 mols of 4,4-bis(4-hydroxyphenyl)-pentanoic acid, 0.5 mol phthalic anhydride, and 1.1 mols glycerol was esterified to an acid value of 6.3 to give a product having a softening point of 113° C., and a saponification value of 259.

Example III

A mixture of 2 mols of 4,4-bis(2-hydroxyphenyl)-pentanoic acid, 0.5 mol azelaic acid, and 1.1 mols glycerol esterified to an acid value of 4.29 gave a product having a softening point of 97° C. and a saponification value of 257.

Example IV

A mixture of 2 mols of 4,4-bis(4-hydroxyphenyl)-pentanoic acid, 0.5 mol maleic anhydride, and 1.1 mols glycerol esterified to an acid value of 5.3 gave a product having a softening point of 134° C. and a saponification value of 276.

Example V

A mixture of 3 mols of 4,4-bis(4-hydroxyphenyl)-pentanoic acid, 0.5 mol azelaic acid, and 1.1 mols pentaerythritol was esterified, yielding after 5 hours a product having an acid value of 8, and a softening point of 143° C.

Example VI

A mixture of 2 mols of 4,4-bis(4-hydroxyphenyl)-pentanoic acid, 0.5 mol azelaic acid, and 1.1 mols sorbitol was esterified to an acid value of 10 to give a product having a softening point of 114° C.

Example VII

A mixture of 1 mol of 4,4-bis(4-hydroxyphenyl)-pentanoic acid, 0.5 mol azelaic acid, and 1.1 mols diethanolamine was esterified to an acid value of 38 to give a product having a softening point of 103° C.

Example VIII

A mixture of 1 mol of 4,4-bis(4-hydroxyphenyl)-pentanoic acid, 0.5 mol Emery's Dimer Acid #955, and 1.1 mol ethylene glycol esterified to an acid value of 2.4 gave a product having a softening point of 54° C. and a saponification value of 192.

The mixed esters of polyhydric phenols above described are particularly valuable in preparing high melting resins useful in the formulation of protective coatings, molding compositions and adhesives. A typical ingredient of rosin as well as other naturally-occurring resins is abietic acid, a terpenic acid having a molecular weight of 302. The subject compositions are natural resin acid esters of the above described polyhydric phenols. They are superior to the well known natural rosin esters of polyhydric alcohols, possessing unusually high softening points and chemical resistance making them valuable in varnishes based on their use as the hard resin portion. A typical composition of a natural resin acid ester herein described may be illustrated by the following formula which represents the abietic acid ester of the resinous polyhydric phenol of Formula I above:

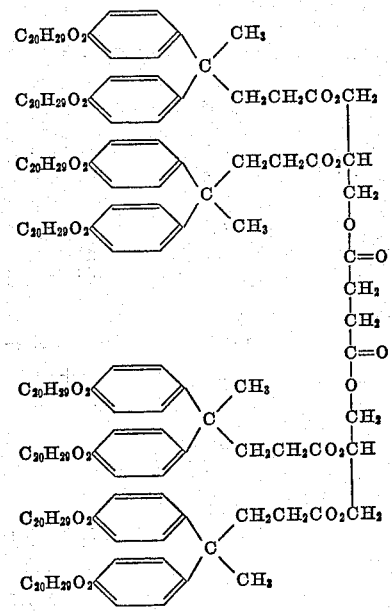

These polyhydric phenols may be esterified with the commercial grades of rosin and other naturally-occurring acid resins such as the kauri, copal, damar, and Congo gums. Typical commercial grades of rosin, for example, have acid values of about 150–175. Acid values as used herein are defined as the number of milligrams of KOH required to neutralize the acid present in a one-gram sample. Typical damar gums have acid values ranging from 18 to 60. Kauri gums have acid values varying from 60–80. Copal gums have acid values in the range of 105–130. The essential composition of all these naturally-occurring resin acids is based on cyclic terpenic structures of which the abietic acid is typical.

Esterification of the phenolic hydroxyl groups of the resinous polyhydric phenols, above-described, may be carried out by any of the processes known in the art. A convenient method of preparing the resin acid esters consists of carrying out esterification in the presence of acetic anhydride in an amount equivalent to the amount of carboxyl groups to be esterified. This procedure results in the formation of mixed anhydrides of acetic acid and the resin acid, or the acetates of the phenolic hydroxyl groups. On the application of heat at temperatures above the boiling point of acetic acid, the resin acid esters of the phenols are formed as acetic acid is displaced and removed by distillation. Preferred temperatures range from 175–275° C. In some instances, it may be desirable to first form the acetates of the resinous polyhydric phenols by treatment with acetic anhydride before adding the resin acids for acetic acid displacement. Finally, it is possible to esterify by treating the polyhydric phenol with the acid chloride of the desired resin acid.

The natural resin acid esters of polyhydric alcohols have long been used in the formulation of coating compositions to impart hardness and chemical resistance as well as for certain molding and adhesive compositions. It has usually been necessary to enhance these properties by modifying the compounds with complexing agents such as maleic anhydride. An additional result of such modification may be a desired elevation of softening points. Compounds prepared in accordance with the teachings of this invention possess the necessary hardness, chemical resistance and softening points to a controlled degree, variations depending upon the combinations of reactants chosen. Furthermore, the wide range of physical properties which may be obtained, including high melting points, eliminates the necessity for using modifying or complexing agents exemplified by maleic anhydride.

The following examples illustrate the preparation and utility of the subject polyhydric phenol-resin acid esters. The procedure followed consisted of heating a mixture of the resinous polyhydric phenol and natural resin acid at temperatures ranging from about 175–275° C. in the presence of acetic anhydride. The latter was used in amounts at least equivalent to the amount of carboxyl groups to be esterified. The reaction mixture was continuously agitated under conditions which permit the removal, by distillation, of unreacted acetic anhydride and acetic acid formed in the process. A continuous stream of an inert gas was bubbled through the reaction mixture throughout the heating period in order to minimize oxidation and facilitate the removal of water. Proportions hereinafter expressed refer to parts by weight unless otherwise indicated.

*Example IX*

A mixture of 70 parts of the resinous polyhydric phenol of Example III and 99 parts of a commercial grade of rosin, having an acid value of 166 and being light yellow in color, was esterified in the presence of acetic anhydride to an acid value of 5.6 giving a softening point of 125° C.

*Example X*

A mixture of 118 parts of the resinous polyhydric phenol of Example VIII and 99 parts of the rosin used in Example IX was esterified in the presence of acetic anhydride to an acid value of 3.9 to give a softening point of 74° C. It will be noted that the resinous polyhydric phenol used in this example was one based on a dimeric vegetable oil acid resulting in a product having an appreciable amount of oil plasticizer modification. In view of this modification with a plasticizing type acid, the softening point of 74° C. is relatively high.

The utility of natural resin acid esters of this invention is demonstrated by the following example which describes the preparation of a varnish composition therefrom.

*Example XI*

A mixture of 1 part of the natural resin acid ester of Example IX and 2 parts of linseed oil was heated at 245–280° C. for 40 minutes. This mixture was continuously agitated in the presence of inert gas during the heating period. The product, dissolved in xylene to a nonvolatile content of 50%, had a viscosity of A–3 (Gardner-Holdt viscosimeter). Treatment of this varnish with .03% cobalt drier based on nonvolatile content gave a product which when spread in thin films and baked for ½ hour at 150° C. resulted in a flexible tack-free film which was unaffected by exposure for 3 hours to boiling water or for ½ hour to 5% aqueous NaOH at room temperature.

It is to be understood that the above examples are intended to be illustrative only. They should not be construed as limiting the scope of the present invention since embodiments other than those specifically disclosed may be produced without departing from the invention concept taught. It is desired, therefore, that only such limitations be imposed on the appended claims as are stated therein or required by the prior art.

What is claimed is:

1. A new composition of matter comprising the ester of (A) at least one member of the group consisting of abietic acid and acid containing natural resins derived from the exudations of trees with (B) the ester of a polyhydric alcohol having alcoholic hydroxyls as the sole reactive groups and (1) a polycarboxylic acid and (2) a pentanoic acid consisting essentially of 4,4 bis-(4-hydroxyaryl)pentanoic acid wherein the hydroxyaryl radical is a hydroxyphenyl radical and is free from substituents other than alkyl groups of from 1–5 carbon atoms.

2. The composition of claim 1 wherein the pentanoic acid consists essentially of 4,4 bis(4-hydroxyaryl)pentanoic acid wherein the hydroxyaryl radical is a hydroxyphenyl radical and is free from substituents other than alkyl groups of one carbon atom.

3. The composition of claim 2 wherein the pentanoic acid is 4,4 bis(4-hydroxyphenyl)pentanoic acid.

4. The composition of claim 3 wherein said member (A) is abietic acid.

5. The composition of claim 3 wherein said member (A) is rosin.

6. The composition of claim 3 wherein said member (A) is gum damar.

7. The composition of claim 3 wherein said member (A) is gum copal.

8. The composition of claim 3 wherein said polyhydric alcohol is a glycol.

9. The composition of claim 3 wherein said polyhydric alcohol is glycerol.

10. The composition of claim 3 wherein said polyhydric alcohol is sorbitol.

11. The composition of claim 3 wherein said polycarboxylic acid is a dimerized vegetable oil acid.

12. The composition of claim 3 wherein said polycarboxylic acid is azelaic acid.

13. The composition of claim 3 wherein said polycarboxylic acid is phthalic acid.

14. The composition of claim 3 wherein said polycarboxylic acid is succinic acid.

15. The composition of claim 3 wherein said polycarboxylic acid is maleic acid.

16. A method of preparing a composition of matter which comprises the steps of (1) reacting at a temperature of 190–275° C. a substantial amount of polyhydric alcohol having alcoholic hydroxyls as the sole reactive groups, a polycarboxylic acid and a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms and (2) reacting the product of Step (1) at a temperature of from 175–275° C. with a member of the group consisting of abietic acid and acid containing natural resins derived from the exudation of trees.

No references cited.

UNITED STATES PATENT OFFICE
CERTIFICATE OF CORRECTION

Patent No. 2,907,737                          October 6, 1959

Sylvan O. Greenlee

It is hereby certified that error appears in the printed specification of the above numbered patent requiring correction and that the said Letters Patent should read as corrected below.

Column 3, line 59, Example III, for "4,4-bis(2-hydroxyphenyl)-pentanoic acid" read -- 4,4-bis(4-hydroxyphenyl)-pentanoic acid --.

Signed and sealed this 17th day of May 1960.

(SEAL)
Attest:

KARL H. AXLINE                            ROBERT C. WATSON
Attesting Officer                       Commissioner of Patents